(12) United States Patent
High et al.

(10) Patent No.: US 9,921,811 B2
(45) Date of Patent: Mar. 20, 2018

(54) MULTIPLE DISPLAY ENVIRONMENT FOR SOFTWARE DEVELOPMENT PROJECTS

(71) Applicant: Wal-Mart Stores, Inc., Bentonville, AR (US)

(72) Inventors: Donald High, Noel, MO (US); Henry Sampara, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 50 days.

(21) Appl. No.: 15/079,651

(22) Filed: Mar. 24, 2016

(65) Prior Publication Data

US 2016/0283199 A1    Sep. 29, 2016

Related U.S. Application Data

(60) Provisional application No. 62/138,717, filed on Mar. 26, 2015.

(51) Int. Cl.
| | | |
|---|---|---|
| *G06F 9/44* | (2006.01) | |
| *G06F 9/45* | (2006.01) | |

(52) U.S. Cl.
CPC .................. *G06F 8/34* (2013.01); *G06F 8/24* (2013.01); *G06F 8/51* (2013.01)

(58) Field of Classification Search
CPC .................. G06F 8/34; G06F 8/24; G06F 8/51
See application file for complete search history.

(56) References Cited

U.S. PATENT DOCUMENTS

| 5,742,286 A * | 4/1998 | Kung .................... G06F 3/0486 |
| | | 715/733 |
| 7,810,069 B2 | 10/2010 | Charisius et al. |
| 8,195,497 B2 | 6/2012 | Montgomery |
| 8,510,288 B2 * | 8/2013 | Mital .................... G06F 17/246 |
| | | 707/708 |
| 8,819,617 B1 | 8/2014 | Koenig et al. |
| 2002/0016954 A1 * | 2/2002 | Charisius ................. G06F 8/20 |
| | | 717/106 |

(Continued)

OTHER PUBLICATIONS

IceScrum Pro, Kagilum, and Agile Company. htt[ss://www.kagilum.com/icescrum-pro/, Dec. 17, 2014.

(Continued)

*Primary Examiner* — Viva Miller
(74) *Attorney, Agent, or Firm* — McCarter & English, LLP; David R. Burns (57) ABSTRACT

A multi-display system for management of a software development project having a graphical user interface including interactive user interface elements representing one or more tasks in the software project, first and second source code databases, first and second object code databases, a migration module configured to migrate source code from the first source code database to the second source code database and migrate object code from the first object code database to the second object code database in response to a user input to the graphical user interface, a first output module for executing the one or more blocks of object code and displaying an output of the executed object code stored in the first object code database, a second output module for executing the one or more blocks of object code and displaying an output of the executed object code stored in the second object code database.

20 Claims, 7 Drawing Sheets

(56) References Cited

U.S. PATENT DOCUMENTS

| | | |
|---|---|---|
| 2003/0182168 A1 | 9/2003 | Lyons |
| 2004/0017400 A1 | 1/2004 | Ly et al. |
| 2006/0080040 A1* | 4/2006 | Garczarek .......... G01N 30/8624 |
| | | 702/19 |
| 2011/0016375 A1 | 1/2011 | Ramic et al. |
| 2012/0116835 A1 | 5/2012 | Pope et al. |
| 2013/0093695 A1* | 4/2013 | Davidson .............. G06F 3/0416 |
| | | 345/173 |
| 2014/0208290 A1* | 7/2014 | McGillin .................. G06F 8/51 |
| | | 717/106 |

OTHER PUBLICATIONS

Eylean, "Project task and team management board based on lean and agile—Features", http://www.eyelean.com/Project-management-board-features, Dec. 17, 2014.

* cited by examiner

MULTIPLE DISPLAY ENVIRONMENT FOR SOFTWARE DEVELOPMENT PROJECTS

CROSS-REFERENCE TO RELATED APPLICATIONS

This application claims priority to and benefit of U.S. Provisional Patent Application No. 62/138,717, filed Mar. 26, 2015, the entire contents of which are incorporated herein by reference in their entirety.

FIELD OF INVENTION

The disclosure relates generally to interactive project management systems and more particularly to multiple display environments for managing software development projects.

BACKGROUND

Conventionally, software development projects are tracked via a scrum board. The scrum board is a physical chalk board or white board, drawn with a plurality of columns, each representing a different task status. Tasks are then tracked individually by being identified on a note paper having adhesive backing and removably attached to the board within the column representing the current status of that task. However, such methodology does not allow the user of the scrum board to exert direct control over the location of task-associated code, view the output of the task-associated code, or interact with the output to refine results, thereby risking inconsistency between the board and actual task status, as well as being inefficient.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As discussed above, tracking software development projects via a conventional scrum board does not allow the user of the scrum board to exert direct control over the location of task-associated code, view the output of the task-associated code, or interact with the output to refine results, thereby risking inconsistency between the board and actual task status, as well as being inefficient.

Methods and systems are provided herein for a multi-display system for management of a software development project based on user input, the system, in accordance with various embodiments, including a digital scrum board wherein source and object code relevant to a particular task is associated with an interactive user interface element of the digital scrum board. The multi-display system is also configured to migrate the code between source and object code databases associated with updated task status, advantageously preventing inconsistency between the board and actual task status and further allowing the user of the digital scrum board to exert actual, real-time control over task and associated code status. In accordance with various embodiments, each task status is associated with an interactive output display for rendering and/or refining an output of executed object code associated with the task.

Figure 1:
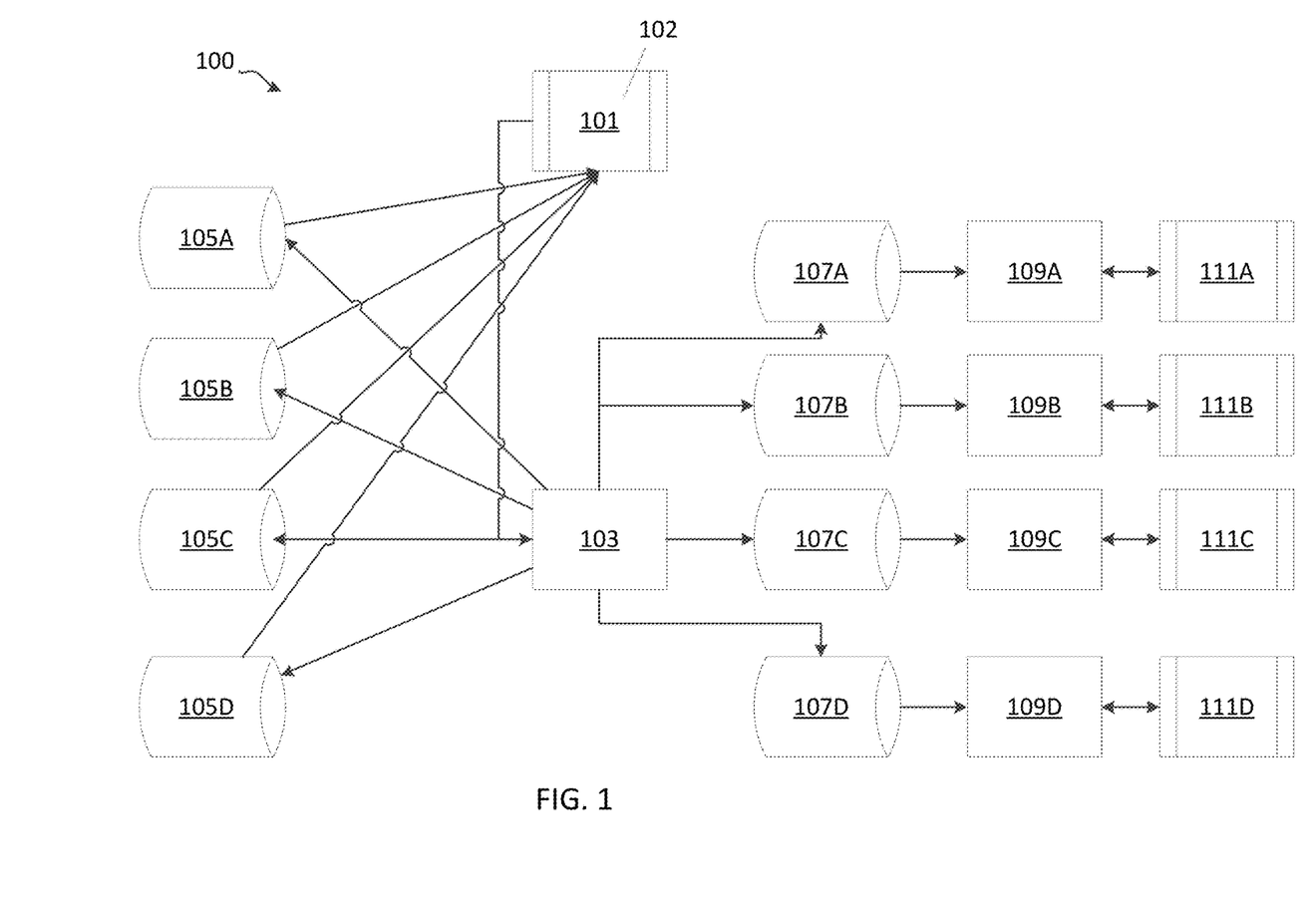
FIG. 1 is a block diagram showing an example multi-display system for configuring a graphical user interface for management of a software development project based on user input, in accordance with various embodiments.
Figure 2:
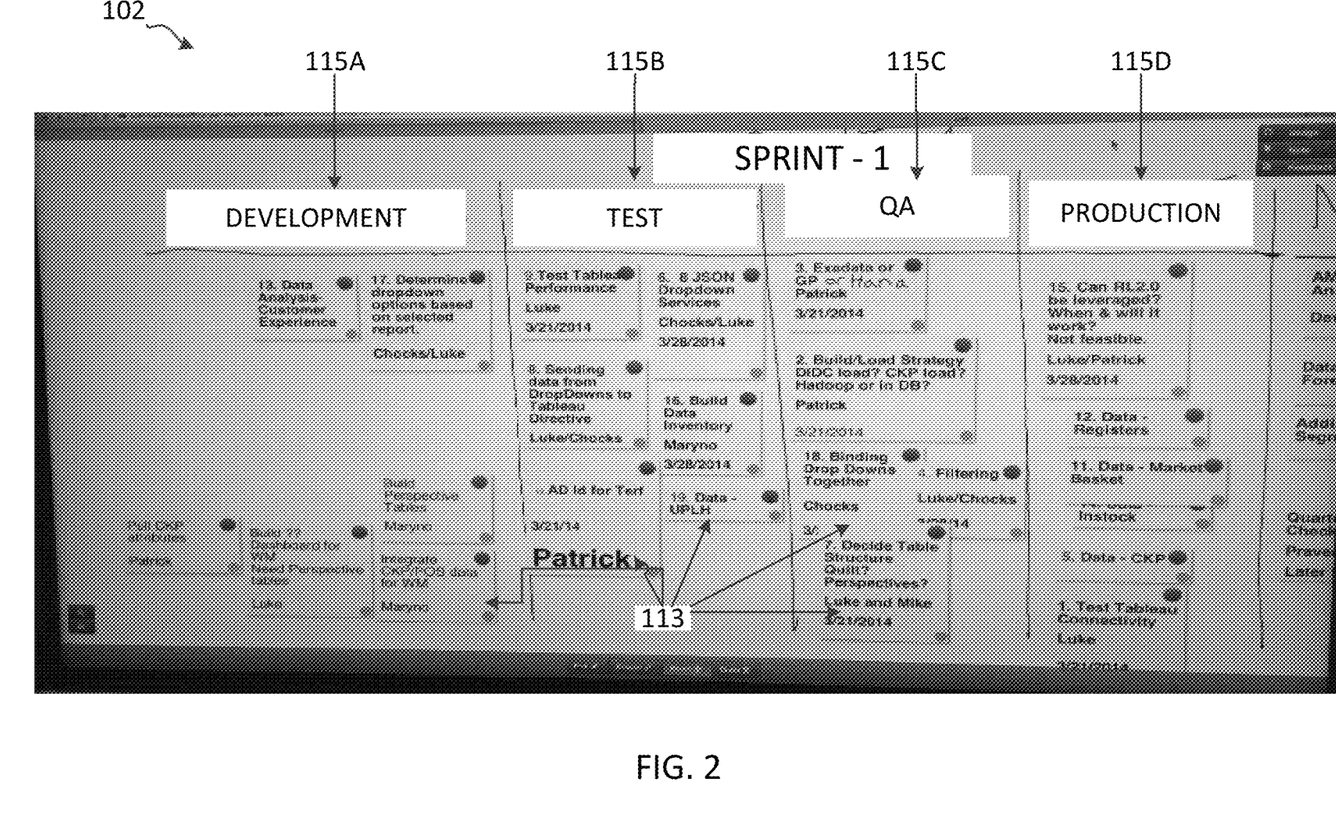
FIG. 2 is a representation of an example graphical user interface including a plurality of interactive user interface elements in accordance with various embodiments.
Figure 3A:
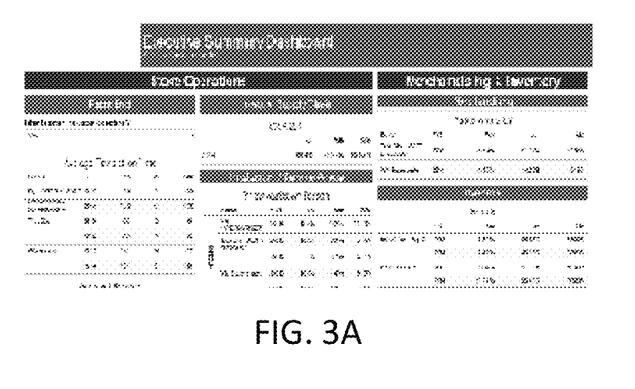
FIGS. 3A-3D are representations of example output displays in accordance with various embodiments.
Figure 3B:
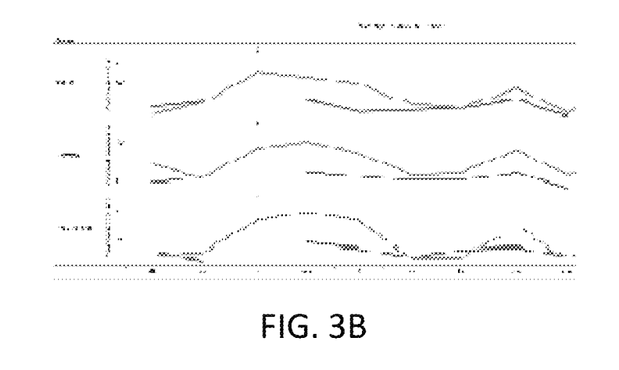
Figure 3C:
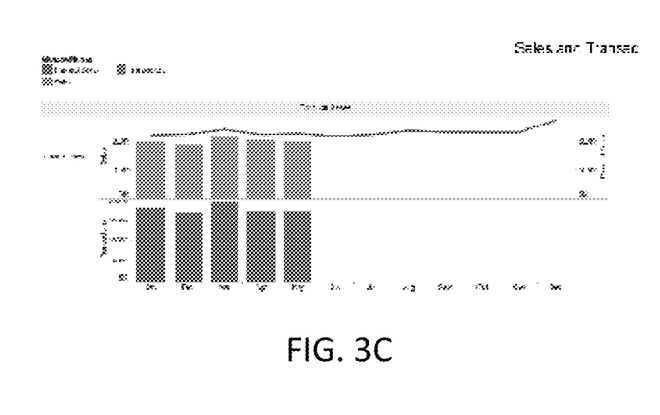
Figure 3D:
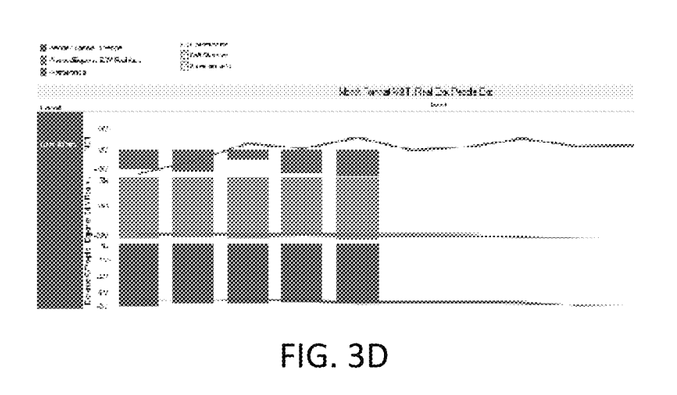

Referring now to FIGS. 1 and 2, an exemplary multi-display system 100 for management of a software development project based on user input includes a display device 101 for displaying the graphical user interface 102 including a plurality of interactive user interface elements 113 representing one or more tasks in the software development project. The system 100 also includes, a plurality of source code databases 105A-D, a plurality of corresponding object code databases 107A-D, and a migration module 103 configured to migrate source code from one of the plurality of source code databases 105A-D to at least one other of the plurality of source code databases 105A-D (as a non-limiting example, from development source code database 105A to test source code database 105B) and to migrate object code from one of the plurality of object code databases 107A-D to at least one other of the plurality of object code databases 107A-D (as a non-limiting example, from development object code database 107A to test source code database 107B). The exemplary multi-display system also includes a plurality of output modules 109A-D, each of the plurality of output modules 109A-D configured to execute object code stored in one or more of the plurality of object code databases 107A-D and instruct a corresponding one of a plurality of output displays 111A-D to display an output of the executed object code.

Display device 101, in accordance with various embodiments can include, but is not limited to, a computer monitor, a touchscreen monitor, a screen of a mobile device (such as but not limited to, a smartphone, a tablet, or an electronic book), and/or any other display device that can be used for displaying an interactive graphical user interface. In accordance with various embodiments, such as but not limited to where the display device 101 is a touchscreen or a display of a mobile device, the display device 101 can also double as an input device for receiving the user input to the graphical user interface 102. In accordance with other embodiments, the display device 101 is instructed by a separate input device such as a computer to display the graphical user interface 102.

A representation of an exemplary graphical user interface 102 for display by the display device 101 is shown in FIG. 2. The exemplary graphical user interface 102 can be configured as a hybrid digital scrum board (HDSB) and includes a plurality of interactive user interface elements 113 representing one or more tasks in the software development project. As a non-limiting example, at least one of the interactive user interface elements 113 can be displayed as a simulated sticky notes (such as shown in the example of FIG. 2). Although the plurality of interactive user interface elements 113 is depicted as a plurality of simulated sticky notes in FIG. 2, it will be apparent in view of this disclosure that the plurality of interactive user interface elements 113 can, in accordance with various embodiments, also be represented by other visualizations, such as but not limited to icons, avatars, and/or any other suitable visualization. Each of the plurality of interactive user interface elements 113 is associated with one or more blocks of source code stored in one or more of the plurality of source code databases 105A-D and associated with one or more blocks of object code stored in one or more of the plurality of object code databases 107A-D, each of the one or more blocks of object code being compiled from a corresponding one of the one or more blocks of source code.

As further shown in FIG. 2, each of the plurality of user interface elements 113 is positioned within a status region 115A-D. Each of the status regions 115A-D, in accordance with various embodiments, can be associated with one of the plurality of source code databases 105A-D and a corresponding one of the plurality of object code databases 107A-D. As shown, the exemplary graphical user interface, in accordance with various embodiments, includes a development status region 115A, test status region 115B, quality assurance status region 115C, and production status region 115D, wherein a location of one or more of the plurality of user interface elements 113 within one of the plurality of status regions 115A-D indicates an association with a corresponding one of the plurality of source code databases 105A-D, a corresponding one of the plurality of object code databases 107A-D, and a corresponding one of the plurality of output modules 109A-D. For example, in accordance with various embodiments and as shown in FIGS. 1-2, development status region 115A corresponds to development source code database 105A, development object code database 107A, and development output module 109A. Test status region 115B corresponds to test source code database 105B, test object code database 107B, and test output module 109B. Quality assurance status region 115C corresponds to quality assurance source code database 105C, quality assurance object code database 107C, and quality assurance output module 109C. Production status region 115D corresponds to production source code database 105D, production object code database 107D, and production output module 109D. Although each of the plurality of status regions 115A-D is depicted in FIG. 2 as a column, it will be apparent in view of this disclosure that any size, shape, and/or configuration of status regions can be used in accordance with various embodiments.

In operation, for example, a user can relocate one or more of the graphical user interface elements 113 within the graphical user interface 102 of the display device 101 by selecting one of the interactive user interface elements 113 and dragging it from one of the plurality of status regions 115A-D to another of the plurality of status regions 115A-D.

The migration module 103, in response to the relocation of the interactive user interface(s) 113, in accordance with various embodiments, is configured to migrate any source code associated with the relocated interactive user interface (s) 113 from the initial one of the plurality of source code databases 105A-D to the new one of the plurality of source code databases 105A-D and also migrates any object code associated with the relocated interactive user interface 113 from the initial one of the plurality of object code databases 107A-D to the new one of the plurality of object code databases 107A-D. The migration module 103 can include a computerized set of instructions stored in a memory of the display device 101, a server, a computer, a cloud storage medium, and/or any other suitable device. Additionally, the migration module 103 can, in accordance with various embodiments, be configured as a special purpose computing device (e.g., an electronic controller, a field programmable gate array, and/or any other suitable device).

Each of the plurality of source code databases 105A-D and the plurality of object code databases 107A-D can be any suitable type of database (such as but not limited to an SQL database) for storing one or more blocks of source code and object code respectively. The source and object code databases 105A-D, 107A-D, in accordance with various embodiments, can be stored in a memory of one or more computers, servers, cloud storage mediums, and/or any other suitable device.

Output modules 109A-D can each include a computerized set of instructions stored in a memory of one or more of the output displays 111A-D, a server, a computer, a cloud storage medium, and/or any other suitable device. Additionally, the output modules 109A-D can, in accordance with various embodiments, each be configured as a special purpose computing device (such as, but not limited to, an electronic controller, a field programmable gate array, and/or any other suitable device).

Each of the plurality of output modules 109A-D, in accordance with various embodiments can be configured to recognize migration of one or more blocks of object code into or out of a corresponding one of the plurality of object code databases 107A-D. In such embodiments, upon recognizing the migration, each of the plurality of output modules 109A-D automatically executes one or more of the blocks of object code stored in the corresponding one of the plurality of object code databases 107A-D. Also in accordance with various embodiments, each of the plurality of output modules 109A-D is configured to execute the one of the one or more blocks of object code upon receiving a user or machine command (such as, but not limited to, via any one of the display device 101, an input device, the migration module, one or more of the source code databases 105A-D, one or more of the object code databases 107A-D, one or more of the output displays 111A-D, and/or any other suitable command input). Execution of the one or more blocks of object code can, in accordance with various embodiments, require that each of the plurality of output modules 109A-D is configured to provide a quantity of data for processing by the object code during execution. In accordance with various embodiments, the development output module 109A can be configured to provide a limited, user-designed data set for processing by the object code during execution. In accordance with various embodiments, the test output module 109B can be configured to provide a limited, historical data set for processing by the object code during execution. In accordance with various embodiments, the quality assurance output module 109C can be configured to provide a full-scale, historical data set for processing by the object code during execution. In accordance with various embodiments, the production output module 109D can be configured to provide a full-scale, real-time data set for processing by the object code during execution.

As shown in FIGS. 1, 3A-D, and 5, each of the output modules 109A-D can be configured to instruct at least one of the plurality of output displays 111A-D to display a representation of the executed object code. As further shown in FIGS. 3A-D and 5, the representation of the executed object code is not limited to a particular form and can include, for example, charts, graphs, maps, pictures, videos, and/or any other suitable representation.

Each of the plurality of output displays 111A-D can be any suitable display device such as an LED monitor, a CRT monitor, a television, a CRT monitor, a touchscreen, a mobile device display, and/or any other suitable device. In accordance with various embodiments, one or more of the output displays 111A-D can be configured to be interactive so that a user can further query the displayed results and/or further constrain inputs used during execution of the object code. For example, in accordance with various embodiments, the production output module 109D may execute a block of data analysis object code stored in the production object code database 107D in order to analyze a large quantity of the full-scale, real-time data and instruct one of the plurality of output displays 111A-D to display the representation of the executed object code. However, during review of the results on the output display 111A-D, the user may choose to focus only on a portion of the large quantity of data, in which case the user would interact with the one of the plurality of output displays 111A-D in order to provide instructions to the production output module 109D to filter the data accordingly and re-execute the object code. For example, if the user wanted to focus on a particular aspect of the data such as, as non-limiting examples, only portions relating to a geographical region or location, only portions relating to sales of a particular product, or only portions relating to supply chain metrics, etc., the user would input those restrictions to the interactive output display 111A-D, thereby causing the production output module 109D to filter the data accordingly and re-execute the object code with the filtered data set. The production output module would then instruct the one of the plurality of output displays 111A-D to display the representation of the executed object code.

Figure 4:
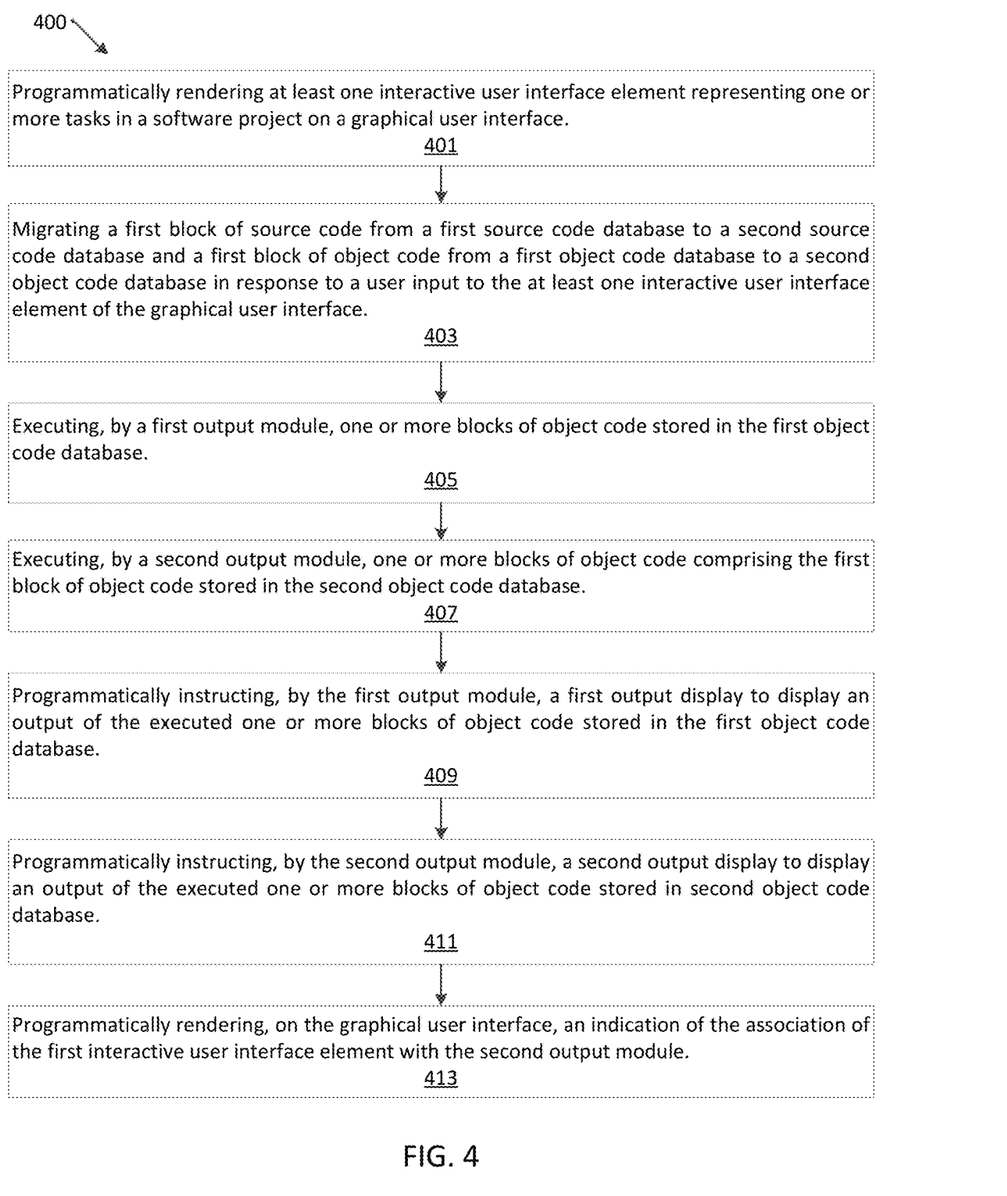
FIG. 4 is a flow diagram illustrating an example method for configuring a graphical user interface for management of a software development project based on user input in accordance with various embodiments.

Referring now to FIG. 4, a method is provided for management of a software development project based on user input. The method includes the step of programmatically rendering at least one interactive user interface element representing one or more tasks in a software project on a graphical user interface 401. The method also includes the step of migrating a first block of source code from a first source code database to a second source code database and a first block of object code from a first object code database to a second object code database in response to a user input to the at least one interactive user interface element of the graphical user interface 403. The method also includes the step of executing, by a first output module, one or more blocks of object code stored in the first object code database 405. The method also includes the step of executing, by a second output module, one or more blocks of object code including the first block of object code stored in the second object code database 407. The method also includes the step of programmatically instructing, by the first output module, a first output display to display an output of the executed one or more blocks of object code stored in the first object code database 409. The method also includes the step of programmatically instructing, by the second output module, a second output display to display an output of the executed one or more blocks of object code stored in second object code database 411.

The step of programmatically rendering at least one interactive user interface element representing one or more tasks in a software project on a graphical user interface 401 can be performed, for example but not limited to, using a display device 101 displaying graphical user interface 102 having a plurality of user interface elements 113 and a plurality of task status regions 115A-D as described above with reference to FIGS. 1-2.

The step of migrating a first block of source code from a first source code database to a second source code database and a first block of object code from a first object code database to a second object code database in response to a user input to the at least one interactive user interface element of the graphical user interface 403 can be performed, for example but not limited to, using migration module 103 to migrate the plurality of source code databases 105A-D and the plurality of object code databases 107A-D in response to a user interaction with display device 101. The user interaction with display device 101 can be an interaction with graphical user interface 102 having a plurality of user interface elements 113 displayed by the display device as described above with reference to FIGS. 1-2.

The step of executing, by a first output module, one or more blocks of object code stored in the first object code database 405 and the step of executing, by a second output module, one or more blocks of object code including the first block of object code stored in the second object code database 407 can each be performed, for example but not limited to, using at least one of the plurality of output modules 109A-D with at least one of the plurality of object code databases 107A-D as described above with reference to FIGS. 1-2.

Figure 5:
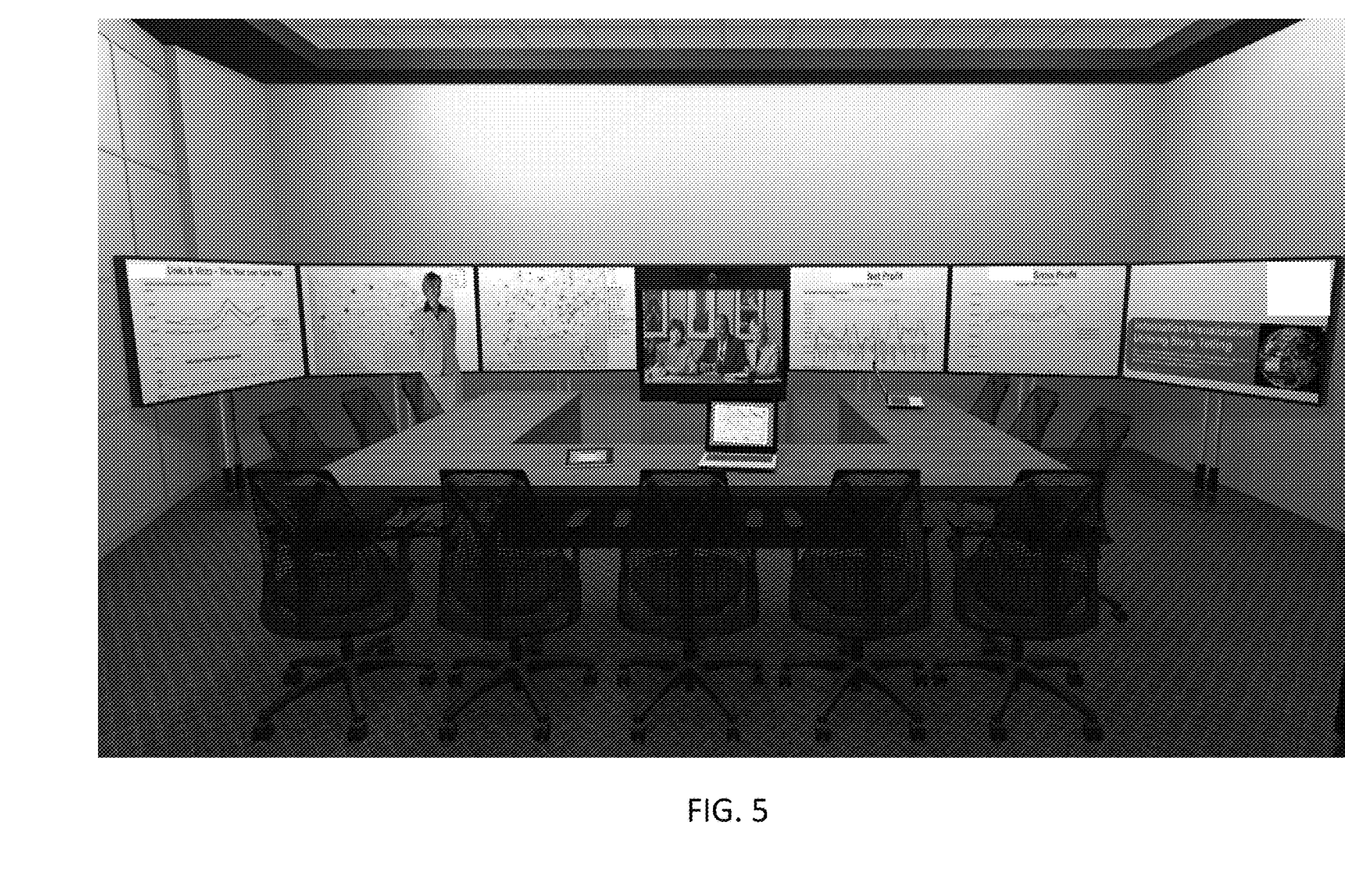
FIG. 5 is a representation of an example room configured for user interaction with a multi-display system for configuring a graphical user interface for management of a software development project in accordance with various embodiments.

The step of programmatically instructing, by the first output module, a first output display to display an output of the executed one or more blocks of object code stored in the first object code database 409 and the step of programmatically instructing, by the second output module, a second output display to display an output of the executed one or more blocks of object code stored in second object code database 411 can each be performed, for example but not limited to, using at least one of the plurality of output modules 109A-D with at least one of the plurality of object code databases 107A-D and at least one of the plurality of output displays 111A-D as described above with reference to FIGS. 1-3. FIG. 5 is a representation of an exemplary conference or meeting room configured for user interaction with a multi-display system. As shown in the exemplary room, the room includes a display device (e.g., display device 101 as discussed hereinabove), a videoconferencing screen, and a plurality of output displays (e.g., output displays 111A-D as discussed hereinabove). In use, one or more of the meeting participants would view an initial arrangement of the interactive user interface elements (e.g., interactive user interface elements 113) and adjust as appropriate, then populating a plurality of results distributed on each of the output displays). The meeting participants would then be able to discuss the results, interact with the output displays in order to narrow, broaden or otherwise target the scope of the results. The meeting participants can also relocate one or more of the plurality of interactive user interface elements on the display device in order to promote or demote each particular task as appropriate.

Non-Limiting Example Computing Devices

Figure 6:
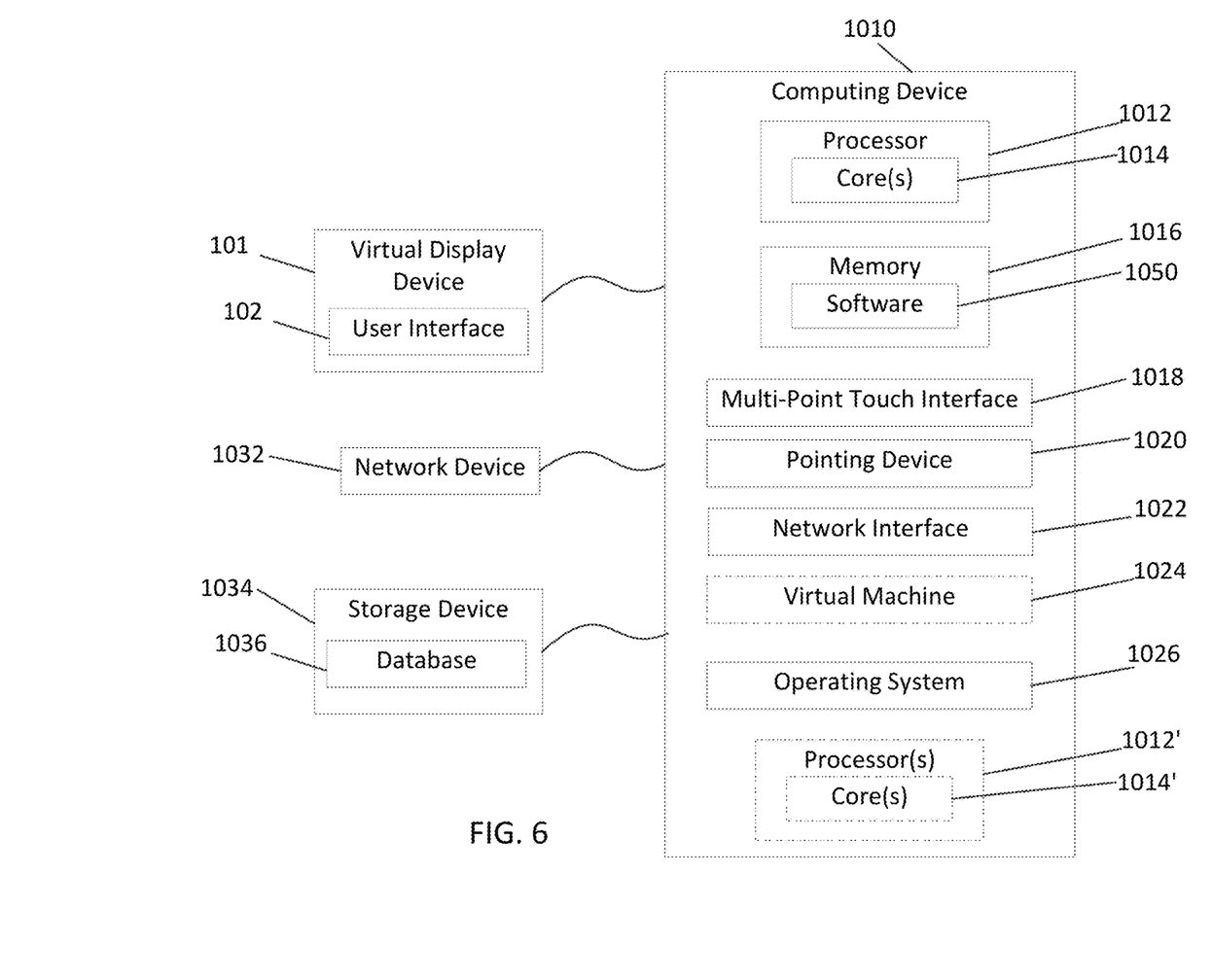
FIG. 6 is an example computational device block diagram depicting various components that can be used to implement various of the disclosed embodiments.

FIG. 6 is a block diagram of an exemplary computing device 1010 such as can be used, or portions thereof, in accordance with various embodiments as described above with reference to FIGS. 1-5. The computing device 1010 includes one or more non-transitory computer-readable media for storing one or more computer-executable instructions or software for implementing exemplary embodiments.

The non-transitory computer-readable media can include, but are not limited to, one or more types of hardware memory, non-transitory tangible media (for example, one or more magnetic storage disks, one or more optical disks, one or more flash drives), and the like. For example, memory 1016 included in the computing device 1010 can store computer-readable and computer-executable instructions or software for performing the operations disclosed herein. For example, the memory can store software application 1040 which is programmed to perform various of the disclosed operations as discussed with respect to FIGS. 1-5. The computing device 1010 can also include configurable and/or programmable processor 1012 and associated core 1014, and optionally, one or more additional configurable and/or programmable processing devices, e.g., processor(s) 1012' and associated core(s) 1014' (for example, in the case of computational devices having multiple processors/cores), for executing computer-readable and computer-executable instructions or software stored in the memory 1016 and other programs for controlling system hardware. Processor 1012 and processor(s) 1012' can each be a single core processor or multiple core (1014 and 1014') processor.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 1016 can include a computational device memory or random access memory, such as but not limited to DRAM, SRAM, EDO RAM, and the like. Memory 1016 can include other types of memory as well, or combinations thereof.

A user can interact with the computing device 1010 through a visual display device 101, 111A-D, such as a computer monitor, which can display one or more user interfaces 102 that can be provided in accordance with exemplary embodiments. The computing device 1010 can include other I/O devices for receiving input from a user, for example, a keyboard or any suitable multi-point touch interface 1018, a pointing device 1020 (e.g., a mouse). The keyboard 1018 and the pointing device 1020 can be coupled to the visual display device 101, 111A-D. The computing device 1010 can include other suitable conventional I/O peripherals.

The computing device 1010 can also include one or more storage devices 1034, such as but not limited to a hard-drive, CD-ROM, or other computer readable media, for storing data and computer-readable instructions and/or software that perform operations disclosed herein. Exemplary storage device 1034 can also store one or more databases for storing any suitable information required to implement exemplary embodiments. The databases can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

Figure 7:
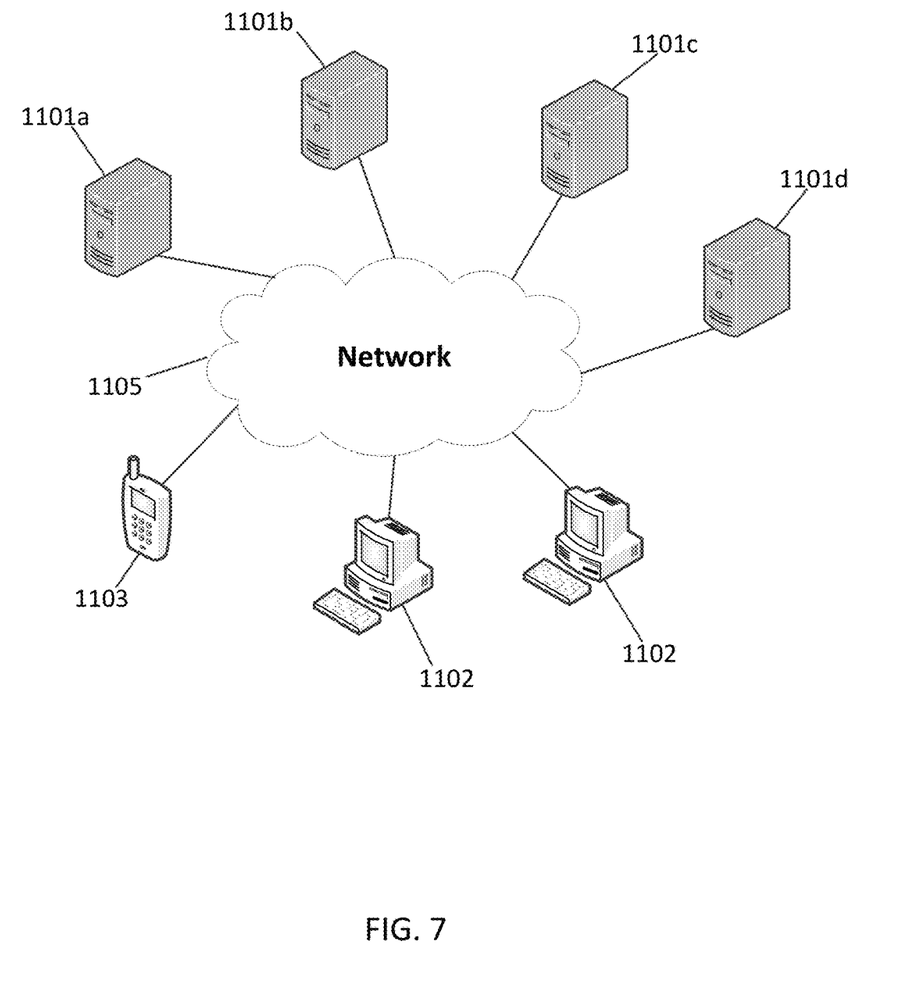
FIG. 7 is an example computational device block diagram depicting various components that can be used to implement various of the disclosed embodiments in a distributed system.

FIG. 7 is an example computational device block diagram of certain distributed embodiments. Although FIGS. 1 and 6, and portions of the exemplary discussion above, make reference to a centralized multi-display system 100 operating on a single computing device, one will recognize that various of the modules within the multi-display system 100 may instead be distributed across a network 1105 in separate server systems 1101a-d and possibly in user systems, such as kiosk, desktop computer device 1102, or mobile computer device 1103. For example, users may download an application to their desktop computer device or mobile computer device, which is configured to show an interactive digital rendering of the meeting room and perform the operations of the display device 101, graphical user interface 102, output modules 109A-D, and/or output displays 111A-D. In some distributed systems, the modules of the multi-display system 100 can be separately located on server systems 1101a-d and can be in communication with one another across the network 1105.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A display system for management of multiple phases of a software development project, the system comprising:
   at least one display device for displaying a graphical user interface, the graphical user interface including a plurality of interactive user interface elements representing one or more tasks in the software project, the plurality of interactive user interface elements located in a plurality of regions of the graphical user interface, each region of the plurality of regions representing a different phase of the software development project;
   first and second source code databases configured to store one or more blocks of source code;
   first and second object code databases configured to store one or more blocks of object code;
   a first block of source code associated with a first interactive user interface element of the plurality of interactive user interface elements, the first interactive user interface element located in a first region of the graphical user interface;
   a first block of object code associated with the first interactive user interface element and first region and compiled from the first block of source code; and
   a processor configured to execute:
      a migration module configured to migrate the first block of source code from the first source code database to the second source code database and migrate the first block of object code from the first object code database to the second object code database in response to a user input to the first interactive user interface element relocating the first interactive user interface element from the first region of the graphical user interface to a second region of the graphical user interface, the first block of source code and first block of object code changing associations to the second region based on the relocating of the first interactive user interface element;
      a first output module configured to execute the one or more blocks of object code stored in the first object code database, the first output module being further configured to instruct the at least one display device to display an output of the executed one or more blocks of object code stored in the first object code database; and
      a second output module configured to execute the one or more blocks of object code, comprising the first block of object code, stored in the second object code database, the second output module being further configured to instruct the at least one display device to display an output of the executed one or more blocks of object code stored in the second object code database,
      wherein the first output module is further configured to provide a first quantity of data for analysis during execution of the one or more blocks of object code stored in the first object code database and the second output module is further configured to provide a second quantity of data for analysis during execution of the one or more blocks of object code stored in the second object code database, and
      wherein the graphical user interface provides an indication of the association of the first interactive user interface element with the second output module based on the relocating.

2. The system of claim 1, further comprising an input device configured to receive the user input to the at least one of the plurality of interactive user interface elements.

3. The system of claim 2, wherein the input device is at least one of a computer mouse, a joystick, a stylus, a touch pad, and a keyboard.

4. The system of claim 2, wherein the input device is a touch screen integrated with the at least one display device.

5. The system of claim 1, wherein the first quantity of data is a quantity of sample data for analysis and the second quantity of data is a quantity of real data for analysis, and wherein the real data is a larger volume of data than the sample data.

6. The system of claim 5, wherein the first output module is configured to filter the quantity of sample data and re-execute the one or more blocks of object code stored in the first object code database in response to a user interaction with the graphical user interface.

7. The system of claim 5, wherein the second output module is configured to filter the quantity of real data and re-execute the one or more blocks of object code stored in the second object code database in response to a user interaction with the graphical user interface.

8. The system of claim 5, wherein the display of the output of the one or more blocks of object code stored in the first object code database is a graphical representation of the results of the analysis of the sample data.

9. The system of claim 5, wherein the display of the output of the one or more blocks of object code stored in the second object code database is a graphical representation of the results of the analysis of the real data.

10. The system of claim 1, wherein each of the plurality of interactive user interface elements is displayed on the at least one display device as a visual representation of note paper.

11. A method for management of multiple phases of a software development project based on user input, the method comprising:
   programmatically rendering a graphical user interface on at least one display device, the graphical user interface including a plurality of interactive user interface elements representing one or more tasks in the software development project and located in a plurality of regions of the graphical user interface, each region of the plurality of regions representing a different phase of the software development project, the plurality of interactive user elements including a first interactive user interface element associated with a first block of source code stored in a first source code database and a first block of object code stored in a first object code database, the first block of object code being compiled from the first block of source code, the first interactive user interface element located in a first region of the graphical user interface;
   migrating the first block of source code from the first source code database to a second source code database and the first block of object code from the first object code database to a second object code database in response to a user input to the first interactive user interface element relocating the first interactive user interface element from the first region of the graphical user interface to a second region of the graphical user interface, the migrating using a migration module, the first block of source code and first block of object code changing associations to the second region based on the relocating of the first interactive user interface element:
executing, by a first output module, one or more blocks of object code stored in the first object code database;
executing, by a second output module, one or more blocks of object code comprising the first block of object code stored in the second object code database;
programmatically instructing, by the first output module, the at least one display device to display an output of the executed one or more blocks of object code stored in the first object code database;
programmatically instructing, by the second output module, the at least one display device to display an output of the executed one or more blocks of object code stored in second object code database; and
programmatically rendering, on the graphical user interface, an indication of the association of the first interactive user interface element with the second output module based on the relocating,
wherein the first output module provides a first quantity of data for analysis during execution of the one or more blocks of object code stored in the first object code database and the second output module provides a second quantity of data for analysis during execution of the one or more blocks of object code stored in the second object code database.

12. The method of claim 11, comprising using an input device to receive the user input to the at least one interactive user interface element.

13. The method of claim 12, wherein the input device is at least one of a computer mouse, a joystick, a stylus, a touch pad, and a keyboard.

14. The method of claim 12, wherein the input device is a touch screen integrated with the at least one display device.

15. The method of claim 11, wherein the first data is sample data for analysis; and
the second data is a quantity of real data for analysis, and wherein the real data is a larger volume of data than the sample data.

16. The method of claim 15, further comprising filtering the quantity of sample data and re-executing the one or more blocks of object code stored in the first object code database in response to a user interaction with the graphical user interface.

17. The method of claim 15, further comprising filtering the quantity of real data and re-executing the one or more blocks of object code stored in the second object code database in response to a user interaction with the graphical user interface.

18. The method of claim 15, wherein the display of the output of the one or more blocks of object code stored in the first object code database is a graphical representation of analysis of the sample data.

19. The method of claim 15, wherein the display of the output of the one or more blocks of object code stored in the second object code database is a graphical representation of analysis of the real data.

20. The method of claim 15, wherein each of the plurality of interactive user interface elements is displayed on the at least one display device as a visual representation of note paper.

* * * * *